(12) United States Patent
Chu

(10) Patent No.: US 8,594,299 B2
(45) Date of Patent: *Nov. 26, 2013

(54) INTELLIGENT FORMATTING OF VOIP TELEPHONE NUMBERS

(75) Inventor: Lon-Chan Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/269,472

(22) Filed: Oct. 7, 2011

(65) Prior Publication Data

US 2012/0027011 A1 Feb. 2, 2012

Related U.S. Application Data

(63) Continuation of application No. 11/462,540, filed on Aug. 4, 2006, now Pat. No. 8,036,366.

(51) Int. Cl.
*H04M 7/00* (2006.01)

(52) U.S. Cl.
USPC .................. 379/220.01; 379/219; 379/355.01

(58) Field of Classification Search
USPC ................... 379/220.01, 219, 355.01, 355.05
See application file for complete search history.

(56) References Cited

U.S. PATENT DOCUMENTS

| | | | |
|---|---|---|---|
| 5,467,381 A | 11/1995 | Peltonen et al. | |
| 5,961,608 A | 10/1999 | Onosaka et al. | |
| 6,108,540 A | 8/2000 | Sonti et al. | |
| 6,594,257 B1 | 7/2003 | Doshi et al. | |
| 6,751,481 B2 | 6/2004 | Chen et al. | |
| 6,868,416 B2 | 3/2005 | Choi et al. | |
| 6,914,964 B1 * | 7/2005 | Levine | 379/52 |
| 6,999,458 B2 | 2/2006 | Fowler | |
| 7,027,582 B2 | 4/2006 | Khello et al. | |
| 7,336,949 B2 | 2/2008 | Nasielski | |
| 2002/0136387 A1 | 9/2002 | Choi et al. | |
| 2003/0074461 A1 * | 4/2003 | Kang et al. | 709/230 |
| 2004/0243596 A1 | 12/2004 | Lillqvist et al. | |
| 2005/0182781 A1 | 8/2005 | Bouvet | |
| 2005/0243806 A1 | 11/2005 | Sakano et al. | |
| 2005/0286695 A1 * | 12/2005 | Pershan et al. | 379/196 |
| 2006/0034441 A1 * | 2/2006 | Kraft | 379/142.01 |
| 2006/0046785 A1 | 3/2006 | Cagney | |
| 2006/0094353 A1 * | 5/2006 | Nielsen et al. | 455/17 |
| 2006/0165060 A1 * | 7/2006 | Dua | 370/352 |
| 2007/0064919 A1 * | 3/2007 | Chen et al. | 379/355.05 |
| 2007/0238472 A1 * | 10/2007 | Wanless | 455/461 |
| 2009/0219921 A1 * | 9/2009 | Beinroth et al. | 370/352 |
| 2009/0285204 A1 * | 11/2009 | Gallant et al. | 370/352 |
| 2010/0040052 A1 * | 2/2010 | Ku et al. | 370/356 |
| 2010/0167726 A1 | 7/2010 | Schwalb | |

OTHER PUBLICATIONS

McTaggart, Telephone Numbers, Domain Names, and Enumbers, IEEE Communications Magazine, Sep. 2002.
Park, "Address Translation Method for Interworking Between Public and Private ATM Networks", Electronics and Telecommunications Research Institute.
Office Action dated Apr. 28, 2010 in U.S. Appl. No. 11/462,540.
Response to Office Action filed Sep. 28, 2010 in U.S. Appl. No. 11/462,540.
Office Action dated Dec. 22, 2010 in U.S. Appl. No. 11/462,540.
Response to Office Action filed Mar. 22, 2011 in U.S. Appl. No. 11/462,540.
Notice of Allowance and Fee(s) Due dated Jun. 9, 2011 in U.S. Appl. No. 11/462,540.

* cited by examiner

*Primary Examiner* — William Deane, Jr.
(74) *Attorney, Agent, or Firm* — Vierra Magen Marcus LLP

(57) ABSTRACT

A system and method are disclosed for intelligent formatting of VoIP telephone numbers. The intelligent VoIP formatting system includes a presentation and user interface layer, an E.164 formatting engine, a location routine, and a database of telephone number data which are used to deconstruct input telephone numbers and reconstruct them as E.164 compliant telephone numbers.

20 Claims, 11 Drawing Sheets

INTELLIGENT FORMATTING OF VOIP TELEPHONE NUMBERS

CLAIM OF PRIORITY

This application is a continuation of U.S. patent application Ser. No. 11/462,540 filed on Aug. 4, 2006 entitled INTELLIGENT FORMATTING OF VOIP TELEPHONE NUMBERS, which application is incorporated herein by reference in its entirety.

BACKGROUND

IP telephony, also known as voice over IP or VoIP, has become a key driver in the evolution of voice communications. VoIP technology is useful not only for phones, but also as a broad application platform enabling voice interactions on devices such as PCs, mobile handhelds and many other devices where voice communication is an important feature. Several VoIP service providers, such as Skype® and Vonage®, now provide VoIP communications services globally.

In order to technically accommodate the growing number of telephone users around the world, and increased interest in Internet telephony, the International Telecommunications Union (ITU) has adopted a number of protocols to facilitate communications. One such protocol is E.164, which provides a uniform means for identifying any telephone number in the world to any telephony user in the world. This protocol operates for standard public switched telephone networks (PSTNs). Additionally, a standard referred to as Electronic Numbering, or ENUM, has been adopted which uses the domain name system (DNS) to map E.164 formatted telephone numbers to Web addresses or uniform resource locators, thereby effectively enabling the E.164 protocol to be used for IP telephony.

The international E.164 protocol has a standard format for telephone numbers. An E.164 formatted number has at most 15 digits, and contains an E.164 prefix (which is typically a "+" sign), a country code, and a subscriber telephone number. In North America, the subscriber telephone number may for example consist of an area code and a seven digit telephone number.

When making telephone calls via a traditional PSTN, a subscriber is able to enter abbreviated numbers for local and national telephone calls. For example, for a local call in the United States, a user may simply enter the seven digit telephone number without an E.164 prefix, the country code or the area code. Local and national calls are possible with PSTN systems because the fixed-line phones from which such calls are made are hardwired directly to the local PSTN center.

By contrast, there is no such concept of local, long distance or national calls when making a call via Internet telephony. VoIP calls use the Internet, which is world-wide and not tied to any single location. While a VoIP call may be made between two local points, that call may be routed through servers located across the globe. Consequently, existing global VoIP service providers require users to enter fully formatted E.164 telephone numbers. Even when making a local call, within for example the United States, instead of simply entering the seven digit telephone number, the VoIP subscriber must enter "+," then the country code, then the area code, then the telephone number. This is time consuming and bothersome, especially when subscribers are used to the concept of abbreviated telephone numbers for local and national calls with traditional PSTN systems.

SUMMARY

Embodiments of the present system in general relate to a system and method for intelligent formatting of VoIP telephone calls. The intelligent VoIP formatting system includes a presentation and user interface layer, an E.164 formatting engine, a location routine, a database of telephone number data and, optionally, a signaling and voice engine. According to the present system, a user is able to enter telephone numbers for VoIP telephone calls as they would according to a traditional telephone numbering plan for land-line telephone calls.

Upon launching the application program according to the present system, the user may be presented with the presentation and user interface layer, which may include a variety of graphical objects allowing the user to initiate and terminate VoIP telephone calls. The user interface layer may provide the user the ability to set up and store one or more call origin location profiles which identify geographic location information as well as the country and/or area code (if applicable) for the one or more locations from which the user may regularly place VoIP telephone calls, e.g., home, office, satellite office, etc.

Once the user enters a telephone number via the user interface layer and initiates a telephone call, the telephone number is put into in E.164 format via the E.164 formatting engine. The E.164 formatting engine receives the entered phone number and retrieves the call origin location. The E.164 formatting engine is further in communication with the database of stored E.164 telephone call formatting information for a variety of countries or geographic regions. For each country or region, the database may store information including country code, international direct dialing prefix, national direct dialing prefix, minimum local length of a telephone number in that area and/or the national length of a telephone number in that area.

The formatting engine then parses the input telephone number into its constituent segments. The segments may be one or more of the E.164 prefix ("+"), a country code, a direct dialing prefix (international and/or national), an area code and/or a local telephone number. The formatting engine may then check whether the entered telephone number is already fully formatted in the E.164 format. If so, the formatting engine may allow the call to be placed using the input telephone number as is.

If the formatting engine does not detect a valid E.164 telephone number, the engine next determines whether the entered telephone number begins with an international or national direct dialing prefix. If so, the formatting engine removes the international/national direct dialing prefix. If the input number was an international telephone number, the formatting engine concatenates the E.164 prefix ("+") with the number that followed the international direct dialing prefix. If the input number was a national telephone number, the formatting engine concatenates the E.164 prefix and the call destination country code with the number that follows the national direct dialing prefix. The country code may be obtained from the call origin location profile designated by the user. In embodiments, the formatting engine only checks the direct dialing prefixes against direct dialing prefixes for the designated call origin location. However, in an alternative embodiment, the formatting engine may check the direct dialing prefixes for all countries and/or regions in the database.

If the E.164 formatting engine does not detect a direct dialing prefix, the engine may next determine whether the entered telephone number is equal in length to the national length of the country set as the call origin location. If so, the formatting engine interprets this as a call somewhere within the country of the designated call origin location. Accordingly, the formatting engine concatenates the E.164 prefix, the country code for the country of the designated call origin location and the entered telephone number to form a fully formatted E.164 telephone number. The call is then placed using that number.

In many countries, certain shortened telephone numbers are designated for special purposes, such as for example numbers which may be frequently called (e.g., 411) or numbers which are used in cases of emergency (e.g., 911). Accordingly, the formatting engine may detect whether the number length of the entered telephone number is less than the minimum length of local phone number for the country or area designated by the call origin location. If so, the formatting engine places the call using the input telephone number as is.

If none of the above forms of the input number are detected, the formatting engine may lastly treat the entered telephone number as a local call. Thus, the formatting engine concatenates the E.164 prefix, the country code for the call origin location, the area code for the call origin location (if any) and the entered number to form a fully formatted E.164 telephone number. The call is then placed using that number.

In accordance with a further aspect of the present system, the location routine may be used to set up and store multiple call origin location profiles representing different locations from which a user may place VoIP calls. The user may be presented with a call origin location setup user interface in which the user is given the option to enter an arbitrary and/or descriptive name for the call origin location, geographic information for that call origin location, and a country and/or area code for the geographic location.

The call origin location profiles may be stored locally within memory of the user's computing system environment running the application program according to the present system. Alternatively, the location profiles which the user has generated may be maintained on a central server within the VoIP service provider or elsewhere. In such an embodiment, when a profile is generated, it may also be versioned to include a change time stamp which is the time when the call origin location profile is created or last changed. Such a system allows a user to access his or her stored profiles from different computing devices at different locations, and to keep those profiles up to date and synchronized.

DETAILED DESCRIPTION

Embodiments for the present system will now be described with reference to FIGS. 1-11, which generally relate to a system and method for intelligent formatting of VoIP telephone calls. The present system may be embodied as an application program running on any of a variety of computing system environments including for example a desktop personal computer, a laptop, a handheld computer, a personal digital assistant (PDA), a cellular telephone, multiprocessor systems, microprocessor-based systems, programmable consumer electronics, minicomputers, distributed computing environments that include any of the above systems or devices, and the like. The application program of the present system may be included as part of, or operate in conjunction with, a softphone application program running on the computing system environment for enabling VoIP calling. The application program according to the present system may alternatively run on a central server, for example of a VoIP service provider. In such an embodiment, the application program may be accessed and downloaded or used on the above described devices via a browser interface. The application program according to the present system may be coded in a variety of coding languages, including for example C++ and/or Java based languages.

Figure 1:
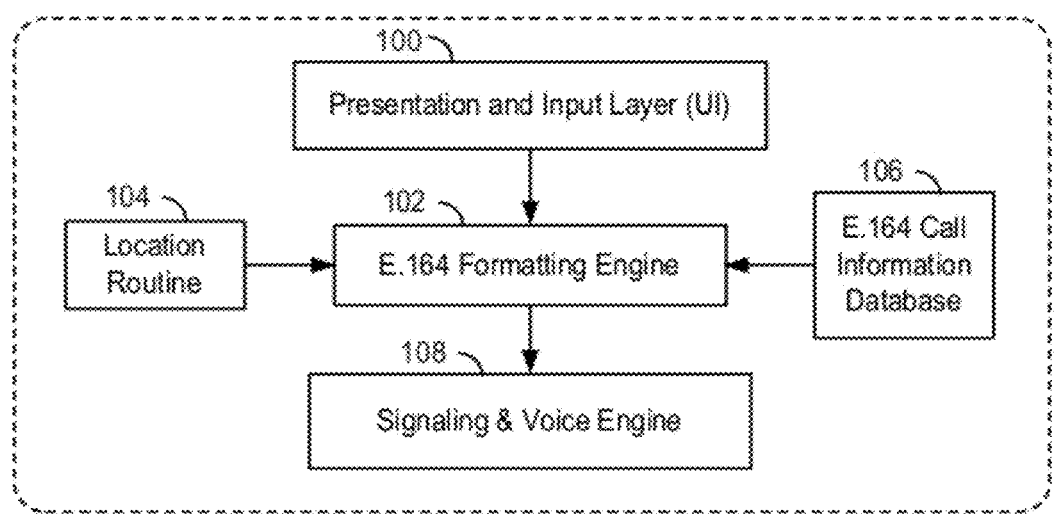
FIG. 1 is a block diagram of the software components of the present system.

As shown in FIG. 1, the intelligent VoIP formatting system includes a presentation and user interface layer 100, an E.164 formatting engine 102, a location routine 104, a database 106 of telephone number data and a signaling and voice engine 108. In embodiments, the signaling and voice engine 108 may not form part of the intelligent VoIP formatting system. Each of these components of the present system is explained in greater detail hereinafter.

Figure 2:
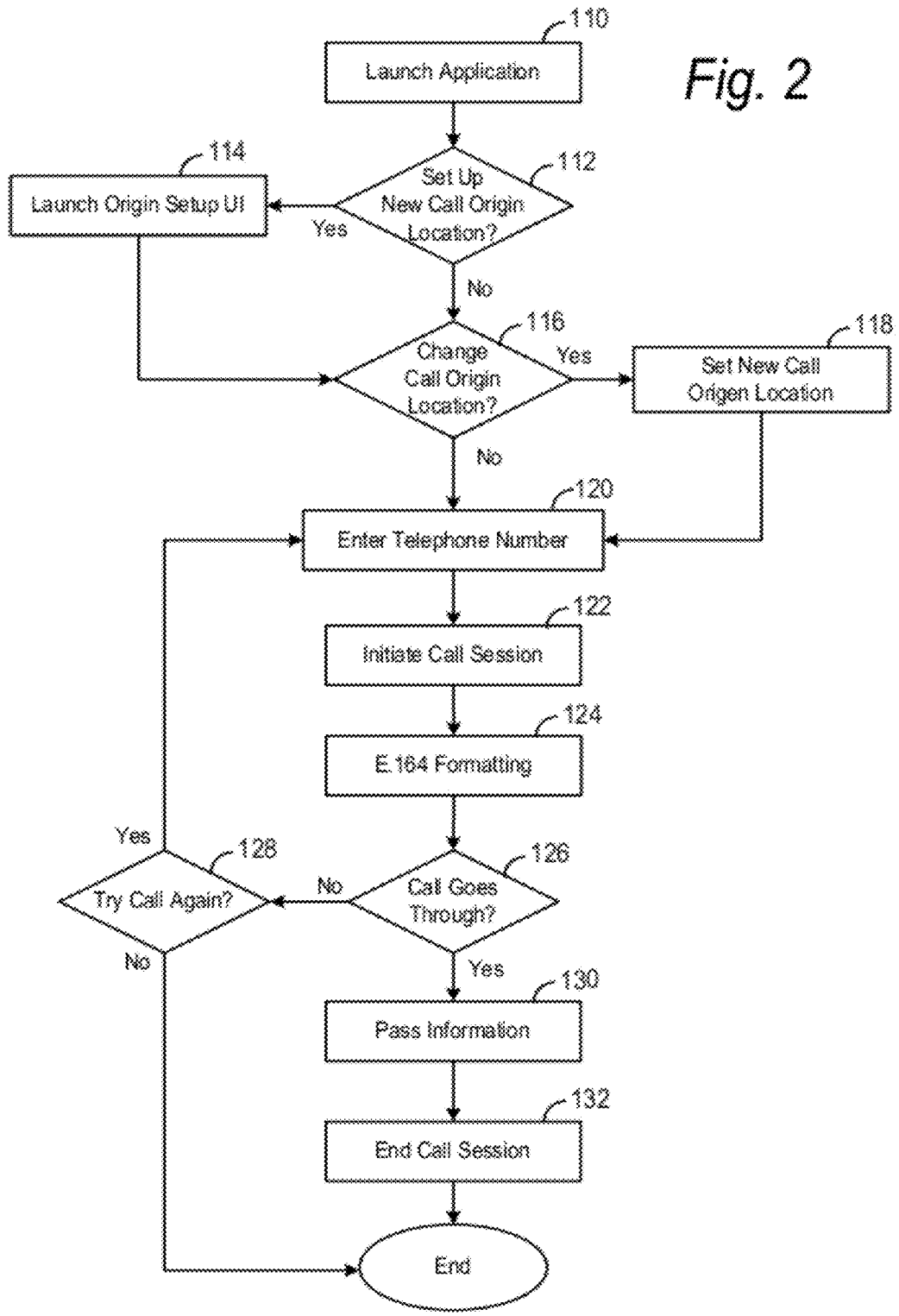
FIG. 2 is a flowchart of the overall operation of the present system for conducting VoIP telephone calls using intelligently formatted VoIP telephone numbers.

Referring now to FIG. 2, the presentation and user interface layer 100 presents a graphical user interface enabling a user to interact with the present system and to initiate and terminate VoIP telephone call sessions. In a step 110, a user may launch the application program according to the present system. For example, where a computing system environment is running a Windows® operating system from Microsoft Corporation, the application program according to the present system may be launched from an icon appearing on the display of the computing environment.

Figure 3:
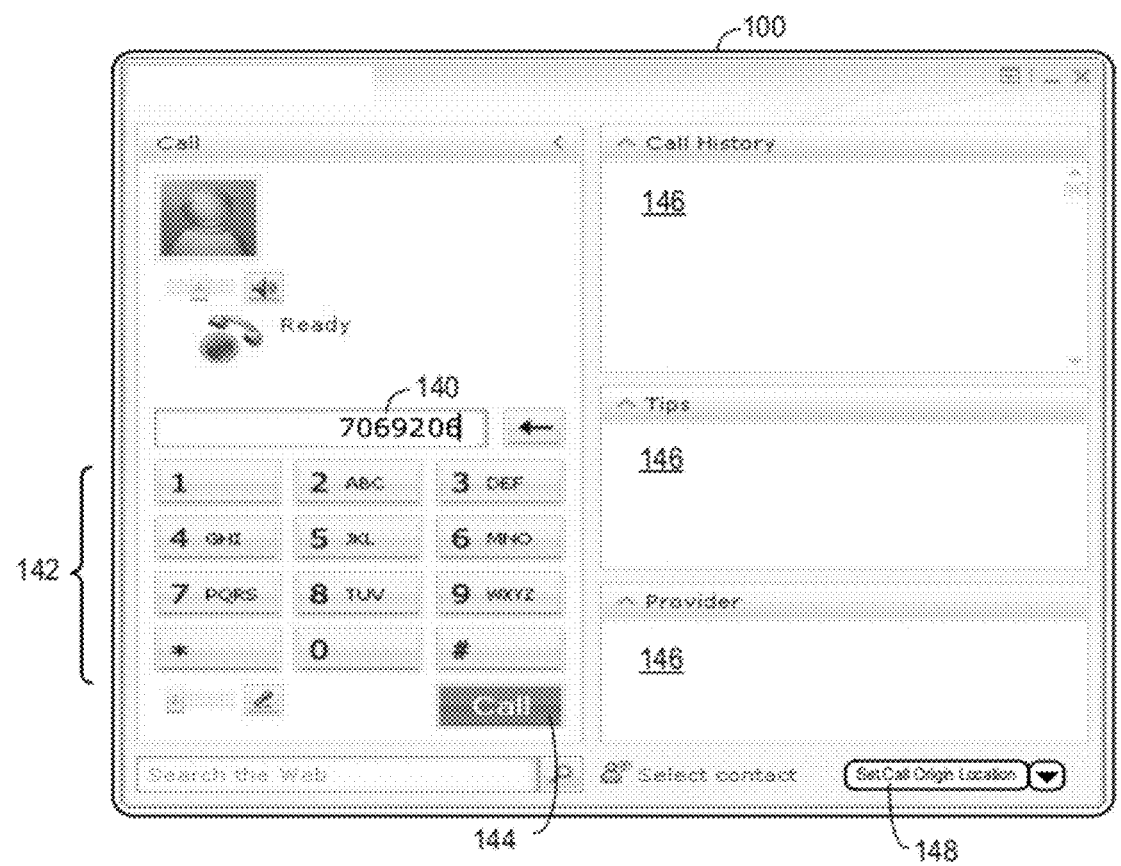
FIG. 3 is an illustration of a presentation and user interface layer according to the present system ready to initiate a telephone call session.

Upon launching the application program in step 110, the user may be presented with the presentation and user interface layer 100, an example of which is shown in FIG. 3. As will be appreciated by those of skill in the art, user interface 100 may include a variety of graphical objects allowing the user to initiate and terminate VoIP telephone calls. For example, user interface 100 may include a telephone number entry box 140, graphical keypad 142, call initiation/termination button 144, as well as one or more additional content windows 146.

Although not critical to the present system, content windows 146 may be used to display various pieces of information, such as a call history of prior calls made by the user, tips for using VoIP features and/or VoIP service provider information. Additional or alternative graphical objects may be presented on interface 100 in alternative embodiments.

In accordance with an aspect of the present system, user interface 100 provides the user the ability to set up and store a call origin location profile. The setup of a call origin location profile is explained in greater detail hereinafter. However, in general a call origin location profile contains geographic location information as well as the country and/or area code (if applicable) regarding an origin of a VoIP telephone call. The call origin location is set by the user (or a default location is used) when making a VoIP telephone call and will typically be the location from where the user is placing the call. However, it is understood that the present system may still operate to format and complete certain VoIP telephone calls even where a user erroneously sets the wrong call origin location (i.e., a location that is not the actual location from where the user is placing the call).

A user may commonly place VoIP calls from different locations, for example from their home and their office. A user may also travel to one or more destinations from which VoIP calls are frequently made. Accordingly, the present system further provides the ability to set up and store multiple call origin location profiles. As explained hereinafter, the call origin location profiles may be stored locally on a user's computing device, or remotely on a server accessible by the user's computing device via a network such as the Internet.

When making a VoIP call, a user may select and set a call origin location from a list of previously defined call origin locations shown on a dropdown menu 148. If a user selects dropdown menu 148, the user may also be provided with the option to set up a new call origin location profile (step 112, FIG. 2). If a user opts to set up a new call origin location profile, the application program of the present system presents the user with a call origin profile setup user interface in step 114 as explained in greater detail hereinafter. It is understood that the option to set up a new call origin location profile may be located on interface 100 separate from the dropdown menu 148.

After a user has set up one or more call origin locations, selecting dropdown menu 148 will display the call origin locations. In step 116, a user is given the option to change the call origin location, for example by selecting a different call origin location from those listed on the dropdown menu 148. If a user selects a new call origin location step 116, the new call origin location is set in step 118 and used for a VoIP call. One of the call origin locations may be designated as a default location and used unless another location is selected.

After a call origin location is set (or if no change in call origin location is made), a user may enter a telephone number in step 120 in telephone number entry box 140. As is known in the art, telephone number entry box 140 may be populated by manually typing in a telephone number. Alternatively, a user may access a contact from a database of his or her stored personal contacts, and have that contact's telephone number automatically inserted into telephone number entry box 140. A user may click a phone number hyperlink on a web page, and have the phone number automatically inserted into telephone number entry box 140. The user may then initiate the telephone call in step 122 by selecting the call initiation/termination button 144. The application program then formats the entered telephone number according to the E.164 protocol in step 124 as explained hereinafter in greater detail with respect to FIG. 6.

Figure 4:
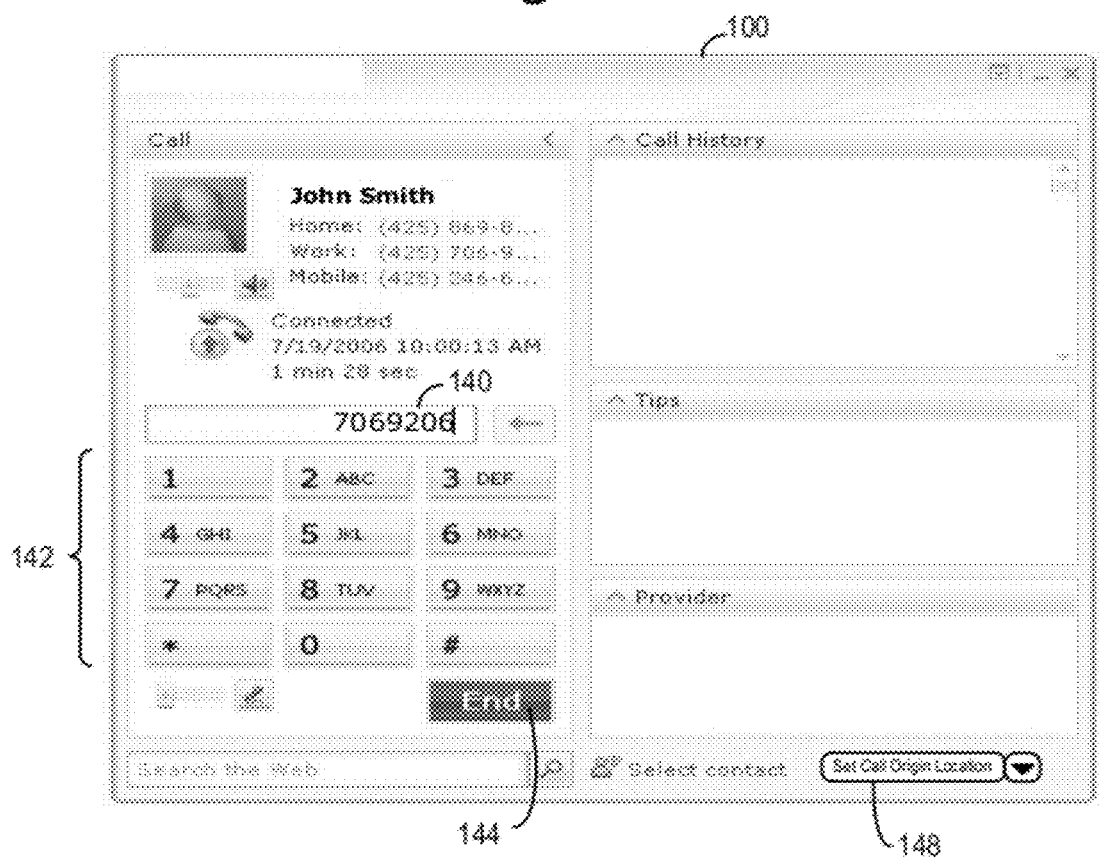
FIG. 4 is an illustration of a presentation and user interface layer according to the present system during a telephone call session.
Figure 5:
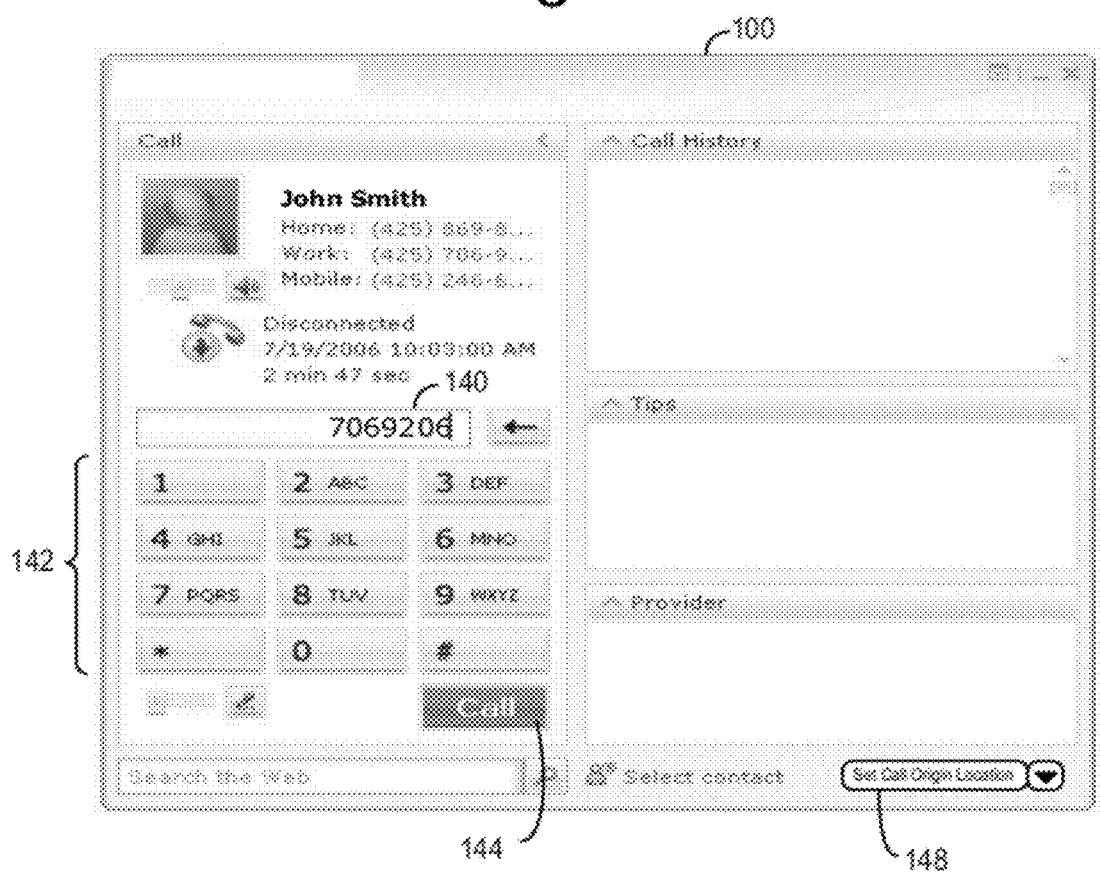
FIG. 5 is an illustration of a presentation and user interface layer according to the present system upon terminating a telephone call session.

If, in a step 126, the telephone call does not go through, the user is given the option in step 128 to try to call again. If the user elects not to try again, the application program may end. Conversely, if the user elects in step 128 to try again or enter a new telephone number, the application program returns to step 120. If the call does go through in step 126, the user is connected, and information is passed to and/or from the user in step 130. A system for routing and connecting VoIP calls is explained in greater detail hereinafter with respect to FIG. 10. Once the user is connected, user interface 100 may indicate the connection, and provide information regarding the telephone call, as shown in FIG. 4. Upon completion of the call, a user may end the call session in step 132 by selecting the call initiation/termination button 144. The call is then disconnected as shown in FIG. 5.

In accordance with a further aspect of the present system, once the user enters a telephone number and initiates a telephone call, the telephone number is formatted in E.164 format in step 124. Formatting of the entered telephone number in step 124 is performed by the E.164 formatting engine 102. The operation of formatting engine 102 is explained in greater detail with respect to the flowchart of FIG. 6.

E.164 formatting engine 102 receives the entered phone number in step 150. Formatting engine 102 then retrieves the call origin location indicated in dropdown menu 148. The E.164 formatting engine 102 is further in communication with database 106, which stores E.164 telephone call formatting information. An example of the information stored in database 106 is shown in the following Table 1.

TABLE 1

| Country/Region | Country Code | IDD Prefix Set | NDD Prefix | Min Local Length | National Length |
|---|---|---|---|---|---|
| United States | 1 | 011 | 1 | 7 | 10 |
| United Kingdom | 44 | 00 | 0 | 4 | NA |
| France | 33 | 00, 40, 50, 70, 90 | 0 | 6 | NA |
| Germany | 49 | 00 | 0 | 4 | NA |
| Spain | 34 | 00 | NA | 6 | 9 |
| Switzerland | 41 | 00 | 0 | 7 | NA |
| Austria | 43 | 00 | 0 | 4 | NA |
| Ireland | 353 | 00 | 0 | 5 | NA |
| Netherlands | 31 | 00 | 0 | 7 | NA |
| Belgium | 32 | 00 | 0 | 6 | NA |
| Sweden | 46 | 00 | 0 | 7 | NA |
| Italy | 39 | 00 | NA | 7 | 10 |
| Denmark | 45 | 00 | NA | 7 | 8 |
| Norway | 47 | 00 | NA | 5 | 8 |
| Finland | 358 | 00, 990, 994, 999 | 0 | 4 | NA |
| Brazil | 55 | 0014, 0015, 0021, 0023, 0031 | 0 | 7 | NA |
| Portugal | 351 | 00 | NA | 6 | 9 |
| Greece | 30 | 00 | NA | 7 | 10 |
| Argentina | 54 | 00 | 0 | 6 | NA |
| Peru | 51 | 00 | 0 | 6 | NA |
| Chile | 56 | 00 | 0 | 6 | NA |
| South Korea | 82 | 001, 002 | 0 | 4 | NA |
| Australia | 61 | 0011 | 0 | 8 | NA |
| Japan | 81 | 001, 010, 0061, 0041 | 0 | 6 | NA |
| Taiwan | 886 | 002 | 0 | 5 | NA |
| Hungary | 36 | 00 | 06 | 6 | NA |
| Czech | 420 | 00 | NA | 7 | 9 |
| Poland | 48 | 00 | 0 | 4 | NA |
| India | 91 | 00 | 0 | 7 | NA |
| China | 86 | 00 | 0 | 7 | NA |

As shown, database 106 may include country codes, international direct dialing (IDD) prefix sets, national direct dialing (NDD) prefixes, minimum local lengths, and national lengths for telephone calls for each of a plurality of countries. It is understood that database 106 may include the above-mentioned information for more or less countries than are shown in Table 1. In a further embodiment, it is understood that the database 106 may include the above-mentioned country code, IDD prefix, etc., for a plurality of cities and/or geographic regions instead of, or in addition to, storing such information on a per country basis. Moreover, it is understood that, for each geographic location in database 106, there may be more or less telephone data than shown in Table 1.

As shown, database 106 may include the country codes for a variety of countries. A country code is the national prefix that is used to dial into a country from another country. For instance, the country code for the United States is 1. When calling to the United States from outside the United States, a 1 is included to indicate the call is to be routed to the United States.

The IDD prefix is a prefix that is used by telephone carriers to dial out of a country to another country. For instance, the IDD for the United States is 011, and when making a direct international call from within the United States, a caller must dial the 011 prefix to indicate that the call is an international call. When making a traditional PSTN direct international telephone call, a user would dial the IDD prefix for the host country and the country code for the destination country. However, the IDD prefix is not used in the E.164 standard. Some countries have multiple IDDs, with each used by a different carrier or for a different purpose.

The NDD prefix is the prefix to make a domestic long distance call. Normally, an NDD prefix is followed by an area code. For instance, the NDD prefix in the United States is 1, and in the United Kingdom is 0. Some countries, such as Spain, do not have an NDD prefix. The NDD prefix is not used in the E.164 standard.

Database 106 may also store Min Local Length, which is the minimum length of a local phone number in a given country or region. For instance, in the United States, the minimum local length of a telephone number is seven digits. In Germany, the minimum local length is four digits.

National Length is the length of the national dialing telephone number without the NDD prefix. For example, in the United States, the national length of a telephone number is ten digits. This parameter is relevant to countries that do not have NDD prefixes. It is also relevant to some regions in the United States where two areas have different area codes, but calls between these areas are still considered local calls and do not include the NDD prefix. For instance, in the Seattle area, PSTN calls from the 425 area code to the 206 area code (and visa-versa) are treated as local calls, and calls between these areas do not include the NDD prefix.

In embodiments, the information in database 106 may be updated periodically. For example, the information associated with each country in database 106 may be versioned to include a date when the information was added or last updated. The signaling and voice engine 108 placing the telephone call may query a server, such as for example a configuration server, located within the VoIP service provider or elsewhere which includes the most up-to-date version of the information for each country included within database 106. If the signaling and voice engine 108 determines that database 106 already has the up-to-date version of the data for each country, the configuration server may notify the signaling and voice engine 108 that there is no newer version of the data. If there is a newer version, the configuration server may send a new set of parameters to the computing system environment for storage in database 106. This will allow any update of data to be quickly distributed to all computing environments running an application program according to the present system.

In an alternative embodiment, instead of being stored locally on a user's computing system environment, an up-to-date database of country codes, IPP prefix sets, NPP prefix sets, etc. may be maintained on a database in a central server within the VoIP service provider or elsewhere. In such embodiments, the signaling and voice engine 108 may access the central database to obtain call information prior to the E.164 formatting engine 102 formatting a telephone number as explained hereinafter.

In step 154, E.164 formatting engine 102 receives call formatting data from database 106 for the call origin location designated in the user interface 100. As explained in greater detail hereinafter, the call origin location is significant in that the telephone call is treated as originating within the country and area code set in the call origin location. Thus, for example, where a particular United States city is designated as the call origin location, and a seven digit telephone number is entered in number entry box 140, the E.164 formatting engine 102 will treat that as a local call within the designated city as explained hereinafter.

In step 156, the formatting engine 102 parses the input telephone number into its constituent segments. The segments may be one or more of the following:

the E.164 prefix ("+")

a country code an IDD prefix an NDD prefix an area code a local telephone number Algorithms for parsing telephone numbers of variable length and composition into one or more of the above segments are known in the art.

In step 158, the formatting engine 102 first checks whether the entered telephone number is already fully formatted in the E.164 format. As indicated above, such telephone numbers include a "+" as the E.164 prefix, a country code and a subscriber telephone number (a local telephone number and possibly an area code). The formatting engine 102 may check the parsed segments to determine if the "+" sign is in the first position, and whether the telephone number is within the proper number of digits for an E.164 telephone number. In embodiments, the formatting engine 102 may further check whether the number includes a valid country code and subscriber number fitting the parameters for telephone numbers within the call destination country. If so, the formatting engine 102 may allow the call to be placed in step 190.

If the engine 102 does not detect a valid E.164 telephone number in step 158, the engine 102 next determines whether the entered telephone number begins with an IDD prefix in step 160. In particular, the engine 102 searches database 106 to determine whether the parsed telephone number includes an IDD prefix in the database 106. An identified IDD prefix indicates that the user is making an international call, and thus the engine 102 interprets the telephone number following the IDD prefix as a complete telephone number including a country code and subscriber telephone number. However, the IDD prefix itself is not part of the E.164 protocol. Therefore, where engine 102 detects an IDD prefix in step 160, the engine 102 removes the IDD prefix in step 162 and then concatenates the E.164 prefix ("+") with the number that followed the IDD prefix in step 164. This number is now in E.164 format and the call is placed in step 190.

If the engine 102 does not detect an IDD prefix in step 160, the engine 102 next determines whether the entered telephone number begins with an NDD prefix in step 166. An NDD prefix indicates that the user is making a national long distance call, and thus the engine 102 interprets the telephone number following the IDD prefix as a national long distance telephone number. However, the NDD prefix itself is not part of the E.164 protocol. Therefore, where engine 102 detects an NDD prefix in step 166, the engine 102 removes the NDD prefix in step 168 and then concatenates the E.164 prefix ("+") and the call destination country code with the number that follows the NDD prefix in step 170. In embodiments, the country code is taken from the call origin location profile designated by the user. In alternative embodiments, the input telephone number and/or a call history of similar numbers dialed in the past may be examined by the formatting engine 102 to determine the country code. Once the number is concatenated in step 170, this number is now in E.164 format and the call is placed in step 190.

In embodiments, the formatting engine 102 only checks the direct dialing prefixes (international and national) against the direct dialing prefixes for the designated call origin location. If the entered number does not include the IDD or NDD prefix for the designated call origin location, the formatting engine moves to the step 172 of comparing the number lengths as explained hereinafter. However, in an alternative embodiment, the formatting engine 102 may check the IDD and NDD prefixes for all countries and/or regions in database 106. In such embodiments, if an IDD prefix from database 106 is identified in the entered telephone number, even if not the IDD prefix of the designated call origin location, the call will still be treated as an international call, and formatted per steps 162 and 164 explained above. The analogous steps may be applied when checking for the NDD prefix.

In a further, hybrid embodiment, the formatting engine 102 may only check the IDD prefix in step 160 for the designated call origin location. However, as "00" is such a common IDD prefix, if "00" is detected as the IDD prefix, regardless of the designated call origin location, the formatting engine 102 will treat the call as an international call and format the call per steps 162 and 164.

If the E.164 formatting engine 102 does not detect an NDD prefix in step 166, the engine 102 next determines whether the entered telephone number is equal in length to the national length of the country set as the call origin location in step 172. In particular, some countries do not include an NDD prefix (some of which are indicated in Table 1 with the designation "NA"). Alternatively, a user may inadvertently omit the NDD prefix when entering a telephone number. Moreover, some calls made to different area codes are still considered local calls and do not include the NDD prefix.

In step 172, if the number of digits entered in a telephone number equals the national length of telephone numbers in the country of the call origin location (e.g., ten digits in the United States), the engine 102 interprets this as a call somewhere within the country of the designated call origin location. Accordingly, in step 174, the engine 102 concatenates the E.164 prefix, the country code for the country of the designated call origin location and the entered telephone number to form a fully formatted E.164 telephone number. The call is then placed using that number in step 190. Again, instead of or in addition to determining the country code from the call origin location, the country code may be determined by examination of the telephone number and/or call history as explained above.

In many countries, certain telephone numbers are designated for special purposes, such as for example numbers which may be frequently called or numbers which are used in cases of emergency. These telephone numbers are typically shorter than the minimum local length of telephone numbers in that country. For example, in the United States, the telephone number "411" is used for local telephone directory service and the telephone number "911" is used in cases of emergency. Accordingly, in step 176, engine 102 detects whether the number length of the entered telephone number is less than the minimum local length for the country or area designated by the call origin location. If so, engine 102 sends that number as is in step 178 and the call is placed in step 190.

While the database 106 may include a country code, IDD prefix, NDD prefix, minimum local length and/or national length for almost all countries which may be used by engine 102 to provide an E.164 formatted telephone number, there are instances where the telephone number within a given country or region does not conform to standard E.164 protocols. For such situations, a custom executable script may be written and stored for deconstructing and then reconstructing a telephone number in the customized format required to place a call to the desired location. Such executable scripts may be stored on database 106 or on databases other than database 106. In step 180, the engine 102 searches the database of customized executable scripts to see whether the entered telephone number conforms to a customized script and whether the entered telephone number may be formatted according to a customized formatting rule. If so, the telephone number is formatted per the customized rule in step 182 and the call is placed in step 190.

If step 184 is reached, engine 102 treats the entered telephone number as a local call. That is, a telephone call being made within the area of the call origin location. Thus, in step 186, engine 102 concatenates the E.164 prefix, the country code for the call origin location, the area code for the call origin location (if any) and the entered number to form a fully formatted E.164 telephone number. The call is then placed in step 190. The country code and/or area code (if any) may alternatively or additionally be obtained by the formatting engine examining the entered telephone number and/or call history as indicated above.

Figure 6:
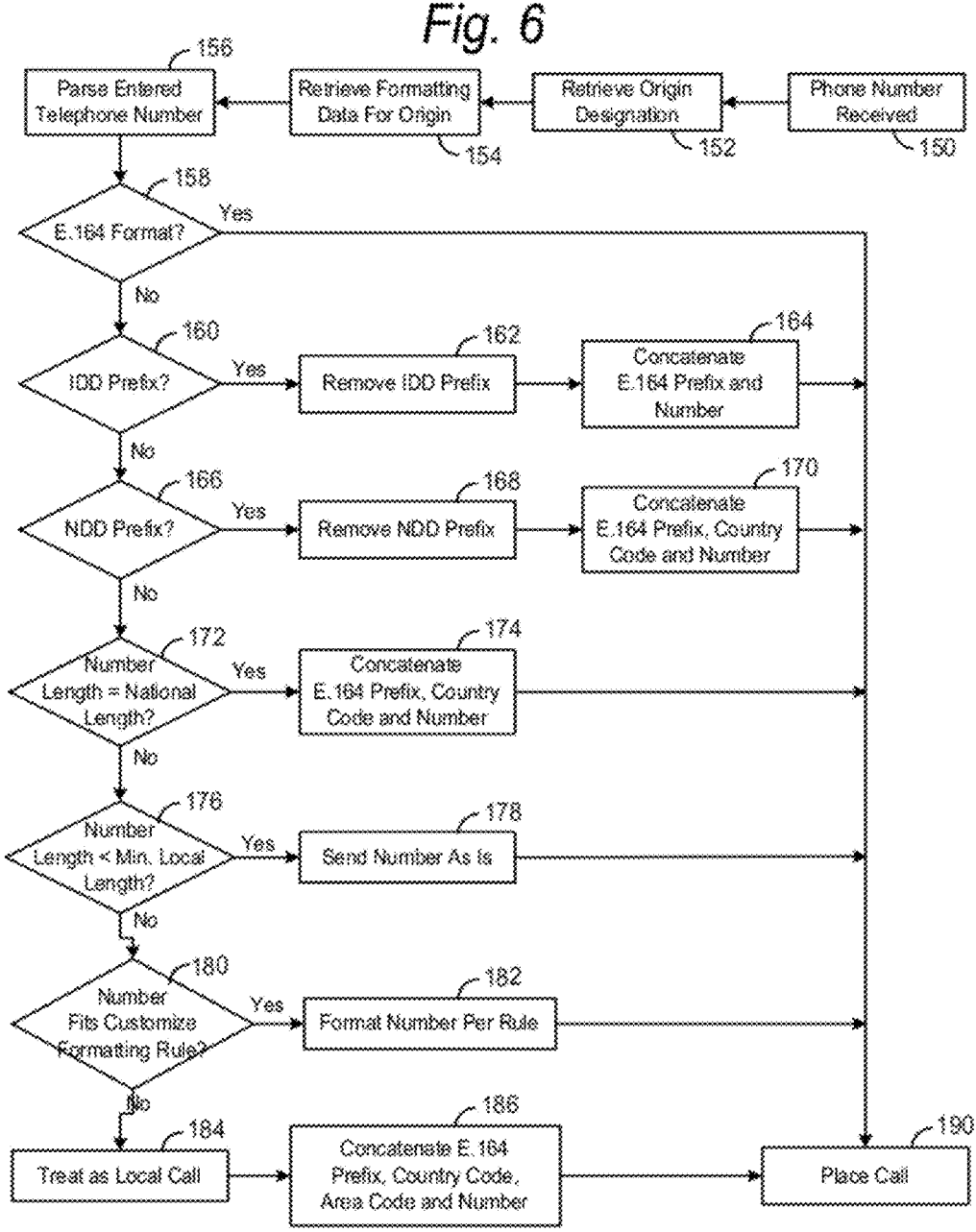
FIG. 6 is a flowchart of the operation of the E.164 formatting engine according to an embodiment of the present system.

Although not shown in FIG. 6, after identifying the IDD prefix in step 160, the formatting engine 102 may examine the remaining digits (without the IDD prefix) to determine whether they are greater than the maximum length of an E.164 formatted telephone number, or greater than the maximum length of a domestic telephone number for the country of the designated call origin location. Similarly, after identifying the IDD prefix in step 160, the formatting engine 102 may examine the remaining numbers to determine if they are less than the minimum length of a domestic telephone number for the country of the designated call origin location. If either of the above cases is true, the engine may display that there was a dialing error over user interface 100.

In further embodiments, in the case of an identified dialing error (either due to the number of digits in the entered telephone number, or because the number does not otherwise result in a connection), the application program according to the present system may access the user's stored call history to see what calls the user has previously made that might be a match to the entered number, and the application program can present these prior telephone numbers to the user to allow the user to select one. In a further embodiment, the application program can go back to the call history to see what calls the user has previously made that might be a match to the entered number, and the application program can try these telephone numbers one by one, for example in the order of most recent to oldest, to see if one of those numbers presents a valid connection. The above described steps for dial error detection may also be applied after identification of the NDD prefix in step 166.

According to the present system as described above, users is able to enter telephone numbers for VoIP telephone calls as they would according to a traditional telephone numbering plan for land-line telephone calls. The following are some examples of the operation of the E.164 formatting engine 102 according to embodiments of the present system.

Example 1

From FIG. 4

The user has selected a call origin location of Redmond, Wash., area code 425. The user enters the following telephone number: 7069206.

The E.164 formatting engine 102 will go through step 158 (not in E.164 format), step 160 (no leading IDD prefix), step 166 (no leading NDD prefix), and steps 172, 176 and 180, and arrive at the determination that the call is a local call. The engine will then concatenate the entered number with the E.164 prefix, the country code for the designated call origin location, and the area code for the designated call origin location:

+1 425 7069206.

Example 2

The user has selected a call origin location of New York, N.Y., area code 212. The user enters the following telephone number: 14153689440.

The E.164 formatting engine 102 will go through step 158 (not in E.164 format) and step 160 (no leading IDD prefix). The formatting engine 102 will next find the NDD prefix ("1") for the specified origin location. The engine 102 will remove the NDD prefix "1" and add the E.164 Prefix ("+") and the United States country code "1" (so a 1 is removed and a 1 is added):

+1 415 3689440.

Example 3

The user has selected a call origin location of New York, N.Y., area code 212. The user enters the following telephone number: 4153689440. (Same example as above, but the NDD Prefix is accidentally omitted):

The E.164 formatting engine 102 will go through step 158 (not in E.164 format), step 160 (no leading IDD prefix), and step 166 (no leading NDD prefix). The formatting engine 102 will then check the national length for the country of origin. In the United States, the national length is 10 digits, which matches the entered number. The engine 102 will add the E.164 Prefix ("+") and the United States country code "1":

+1 415 3689440.

Example 4

The user sets Madrid, Spain as the call origin location. The user dials 00 1 425 7069206.

In step 160, the formatting engine 102 determines that the leading numbers are an IDD prefix. The engine thus understands the call to be an international call. The engine 102 will remove the IDD prefix and add the "+" and country code:

+1 425 7069206.

Example 5

The user is in Madrid, Spain, but accidentally designates San Francisco, Calif., United States (area code 415) from the list of stored origins. The user dials the same number as in Example 4: 00 1 425 7069206.

In one embodiment discussed above, the engine only checks the IDD prefix and the NDD prefix for the designated call origin location. In such an embodiment, as the United States is the designated call origin, the engine will not find the matching IDD prefix or NDD prefix. In such an embodiment, the formatting engine will pass through all of the steps and eventually handle the entered number as a local number and format it as follows:

+1 415 00 1 425 7069206. This will not result in a valid phone call.

In an alternative embodiment discussed above, before concatenating the E.164 number, the engine may check whether the telephone number following the United States country code 1 exceeds the national length of a domestic telephone number in the United States. In the event that it does, the engine 102 may indicate to the user that a dial error has occurred, and the application program may examine call history to try and identify the intended number.

Referring still to Example 5, in a further embodiment discussed above, the engine checks the IDD and NDD prefixes for all countries. In such embodiment, the formatting engine will detect the IDD prefix "00" used for any number of countries in Europe, and would proceed as in Example 4. The engine 102 will remove the IDD prefix and add the "+" and country code:

+1 425 7069206.

Example 6

The user sets the call origin location as the United Kingdom (IDD is 00 and NDD is 0). The user is making an international call to Taiwan, but instead of using the IDD for the United Kingdom, the user uses the IDD for the United States (011) by mistake as follows: 011 886 2 12345678.

In an embodiment only examining prefixes for the designated call origin location, the E.164 formatting engine 102 will go through step 158 (not in E.164 format) and step 160 (no IDD prefix). The formatting engine will next find the NDD prefix ("0") for the designated call origin location (United Kingdom). The call will therefore be interpreted by the formatting engine 102 as a national call within the United Kingdom due to the presence of United Kingdom's NDD prefix. In an embodiment, the formatting engine 102 will remove the NDD prefix, and engine 102 will add the E.164 Prefix ("+") and the United Kingdom country code "44":

+44 11 886 2 12345678. This will likely not result in a valid phone call, and at the very least will not connect the user to the intended recipient in Taiwan.

In an alternative embodiment discussed above, before concatenating the E.164 number, the engine may check whether the telephone number following the United Kingdom country code 44 exceeds the national length of a domestic telephone number in the United Kingdom. In the event that it does, or if the call does not otherwise go through, the engine 102 may indicate to the user that a dial error has occurred, and the application program may examine call history to try and identify the intended number.

In an alternative embodiment discussed above, the engine checks the IDD prefix for all countries (not just for the designated call origin). In such an embodiment, the formatting engine 102 will detect the IDD prefix "011" used for the United States. The engine 102 will thus remove the IDD prefix and add the "+":

+886 2 12345678. This call should go through to the intended recipient in Taiwan.

Figure 7:
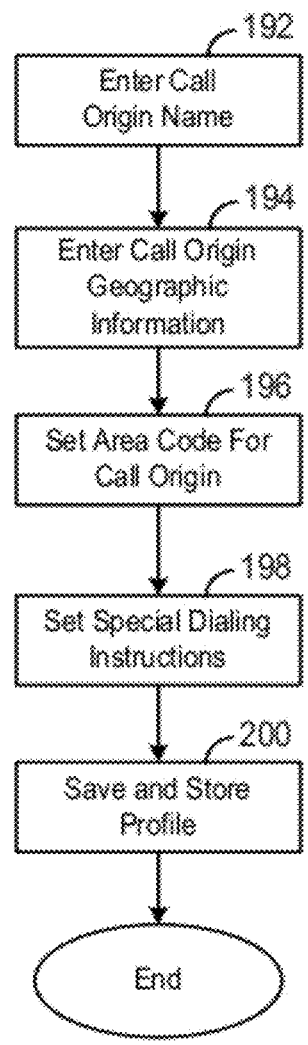
FIG. 7 is a flowchart of a location routine for setting up call origin location profiles.
Figure 8:
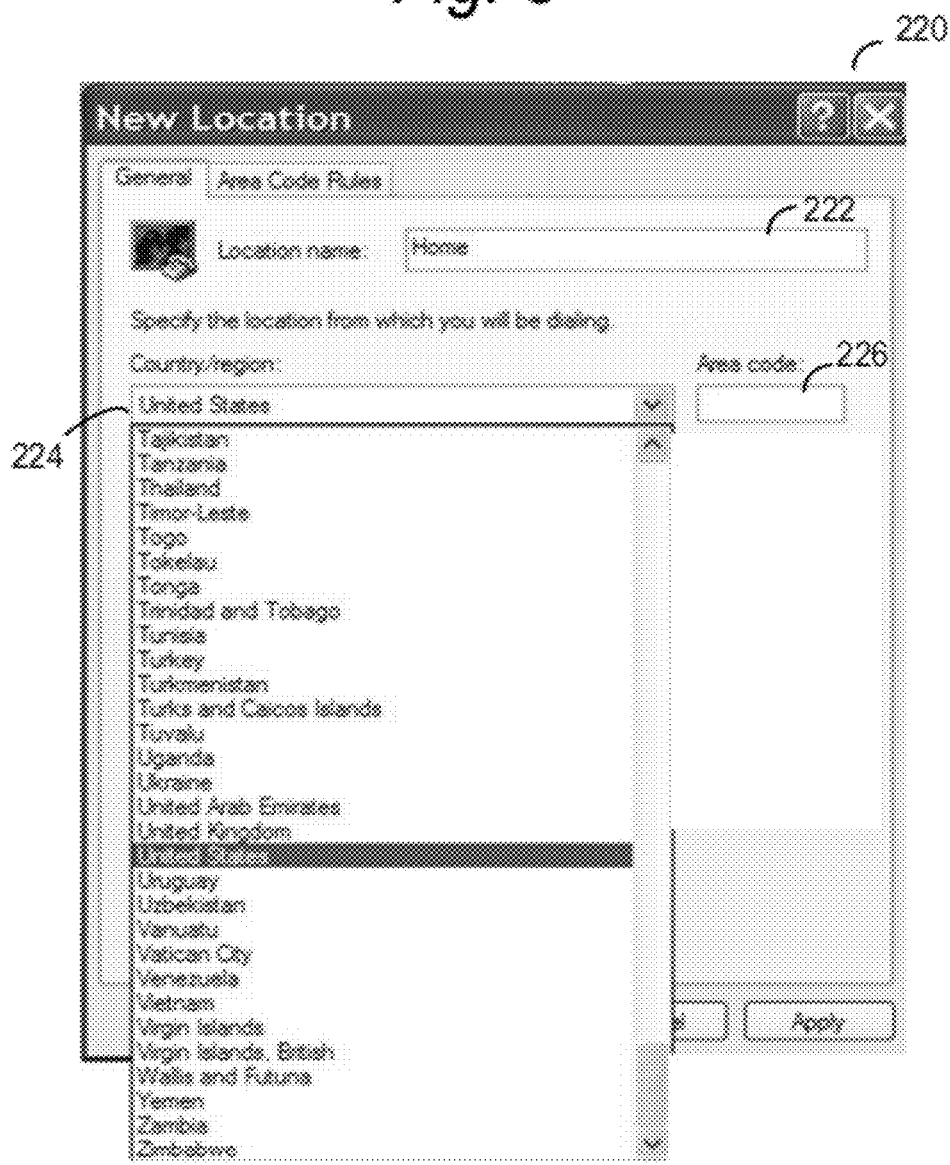
FIG. 8 is a graphical user interface for setting up call origin location profiles.

The process for generating and storing call origin location profiles will now be explained with reference to the flowchart of FIG. 7 and the illustrations of the user interface shown in FIGS. 8 and 9. As indicated above, a user may routinely originate VoIP calls from different locations using a single mobile computing device. Alternatively, a user may use different computing devices which are networked together and capable of communication with a central server and/or each other. Therefore, in accordance with a further aspect of the present system, a user may set up and store multiple call origin location profiles from which a user may select the applicable location when making a VoIP call.

The present system includes location routine 104 for generating and storing call origin location profiles. Once the user selects the option from interface 100 to set up a new call origin location, the user may be presented with a call origin location setup user interface 220, such as for example shown in FIGS. 8 and 9. Referring to the flowchart of FIG. 7, upon launching the call origin setup routine 104, the user is presented with interface 220 in which the user is given the option to enter an arbitrary and/or descriptive name for the call origin location in a text box 222 in step 192. In step 194, the user enters geographic information for that call origin location profile. The information may be entered from a dropdown menu 224 as shown in FIG. 8, or may be manually entered in a text box. The geographic information shown in FIG. 8 includes country designations, but the interface may additionally or alternatively accept region, city, or other geographic designations. The region, city or other geographic designations may be manually entered, or entered from additional dropdown menus presented to the user.

Figure 9:
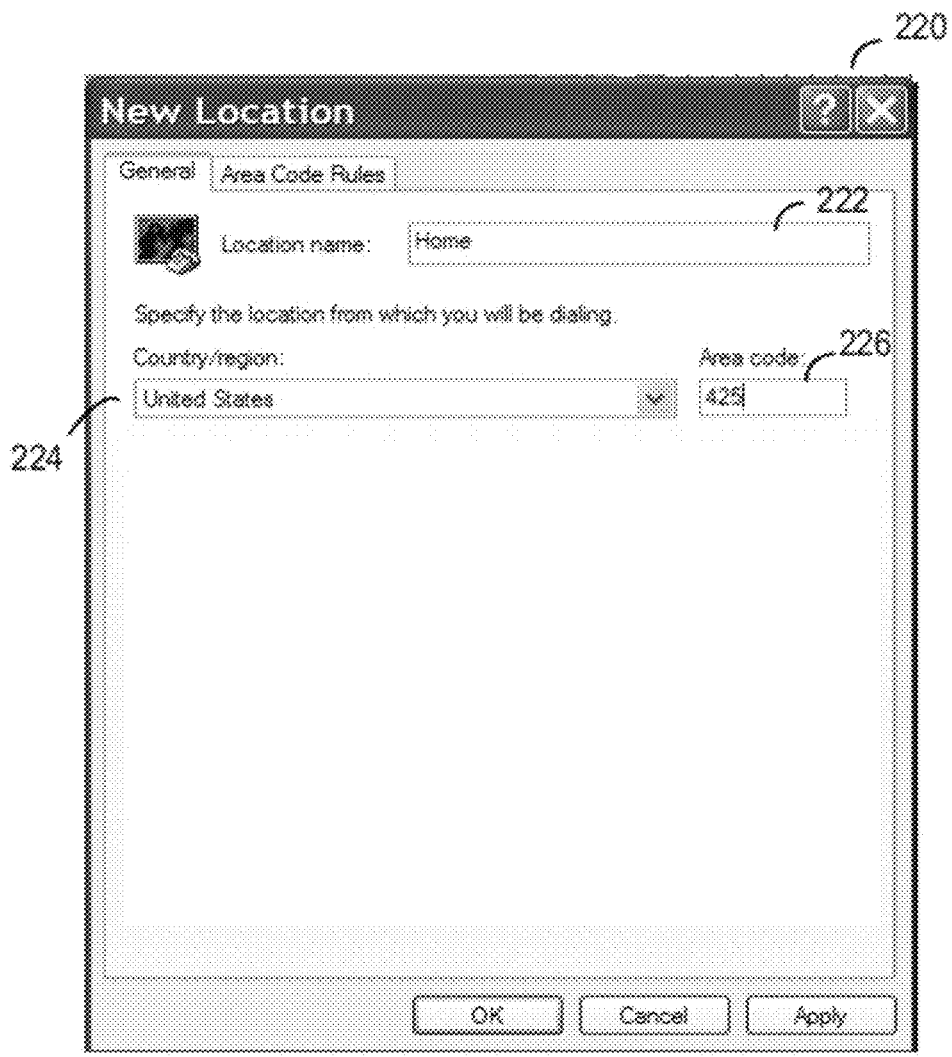
FIG. 9 is a further illustration of a graphical user interface for setting up call origin location profiles.

In step 196, the user may enter the area code for the geographic location, for example in a text box 226 in FIG. 9. In step 198, a user may further be provided with the option of including any special dialing instructions from that location, such as for example blocking certain area codes (e.g. 900) and phone numbers to dial. In step 200, the call origin location profile may be saved and stored.

The call origin location profiles may be stored locally within memory of the user's computing system environment running the application program according to the present system. Alternatively, the location profiles which the user has generated may be maintained on a central server within the VoIP service provider or elsewhere. In such an embodiment, when a profile is generated, it may also be versioned to include a change time stamp which is the time when the call origin location profile is created or last changed. Such a system allows a user to access his or her stored profiles from different computing devices at different locations.

When a user launches the application program according to the present system from a particular computing device, the device can communicate with the server where the profiles are stored, and, by checking time stamps, can download any new or changed profiles so that all computing devices used by a particular user may remain in synchronization with each other. In the above described system of centrally stored and synchronized profiles, the user may designate, on each individual computing device, a particular profile which is to be the default profile for that device. The designation of which profile is the default on each of a user's various devices may be stored locally on the respective computing devices or centrally with the stored profiles. It is understood that synchronization systems which operate other than by time stamps may be used in alternative embodiments of the present system.

Figure 10:
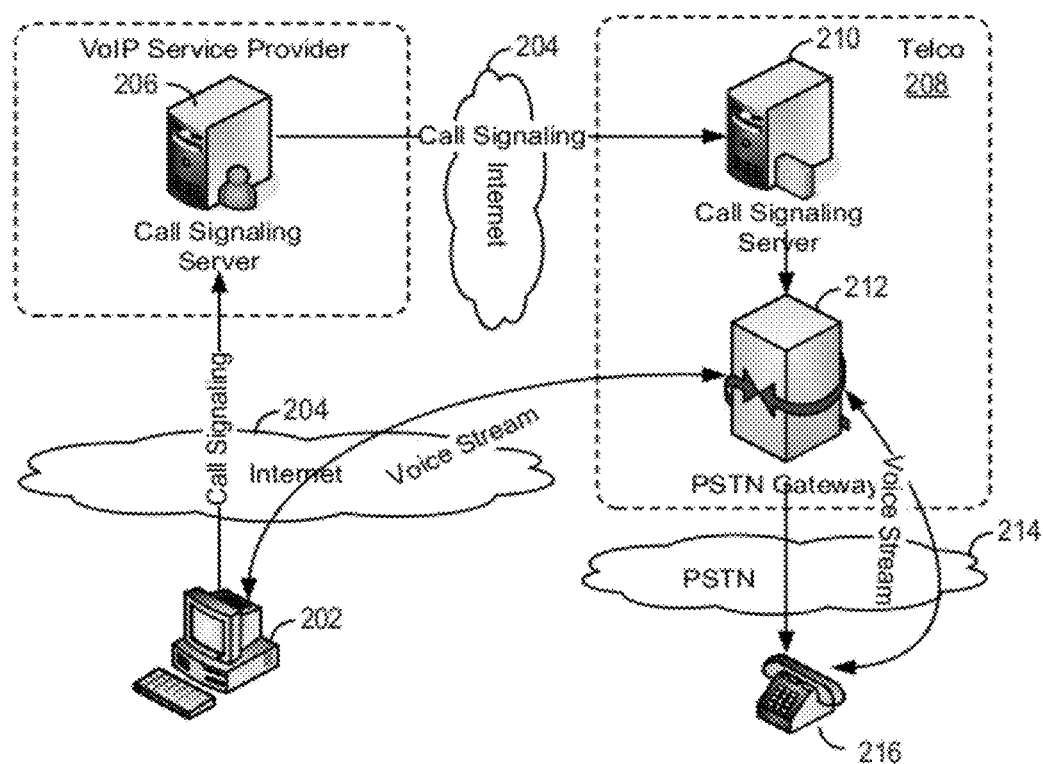
FIG. 10 is a block diagram of a complete VoIP network for supporting VoIP communications according to the present system.

Referring now to FIG. 10, there is shown a system for communications between a computing environment 202 including the application program according to the present system and a PSTN telephone 216. In particular, in computing environment 202, once a telephone number is formatted per the E.164 standard as described above, the call is initiated via the signaling and voice engine 108 (FIG. 1). The signaling and voice engine 108 may be part of a softphone application program running on the computing environment 202. The signaling and voice engine 108 of computing environment 202 sends a call signaling message (including the E.164 formatted phone number) via a network such as the internet 204 to a call signaling server 206 within a VoIP service provider. The call signaling server 206 authenticates the user and routes the call signaling message to a PSTN telephone company service provider ("Telco") 208 via a network such as the internet 204. The call signaling message is received within a call signaling server 210 within Telco 208, which call signaling server 210 authorizes the call and terminates the call to the appropriate PSTN gateway 212.

The PSTN gateway 212 routes the call via PSTN lines 214 to the destination PSTN telephone 216. When a user picks up the telephone at the destination telephone line, the voice stream will be established between the computing environment 202 and the PSTN telephone 216 via the PSTN gateway 212. In one embodiment, SIP (session initiation protocol) may be used for call signaling, but it is understood that other protocols may be used in alternative embodiments of the present system.

In embodiments, the call recipient device can be PSTN telephone or mobile phone. In case of a mobile phone, PSTN gateway 212, PSTN lines 214, and PSTN telephone 216 can be replaced with mobile gateway, mobile network, and mobile phone, respectively. In another embodiment, PSTN telephone 216 can be replaced with a mobile gateway, mobile network, and mobile phone.

Figure 11:
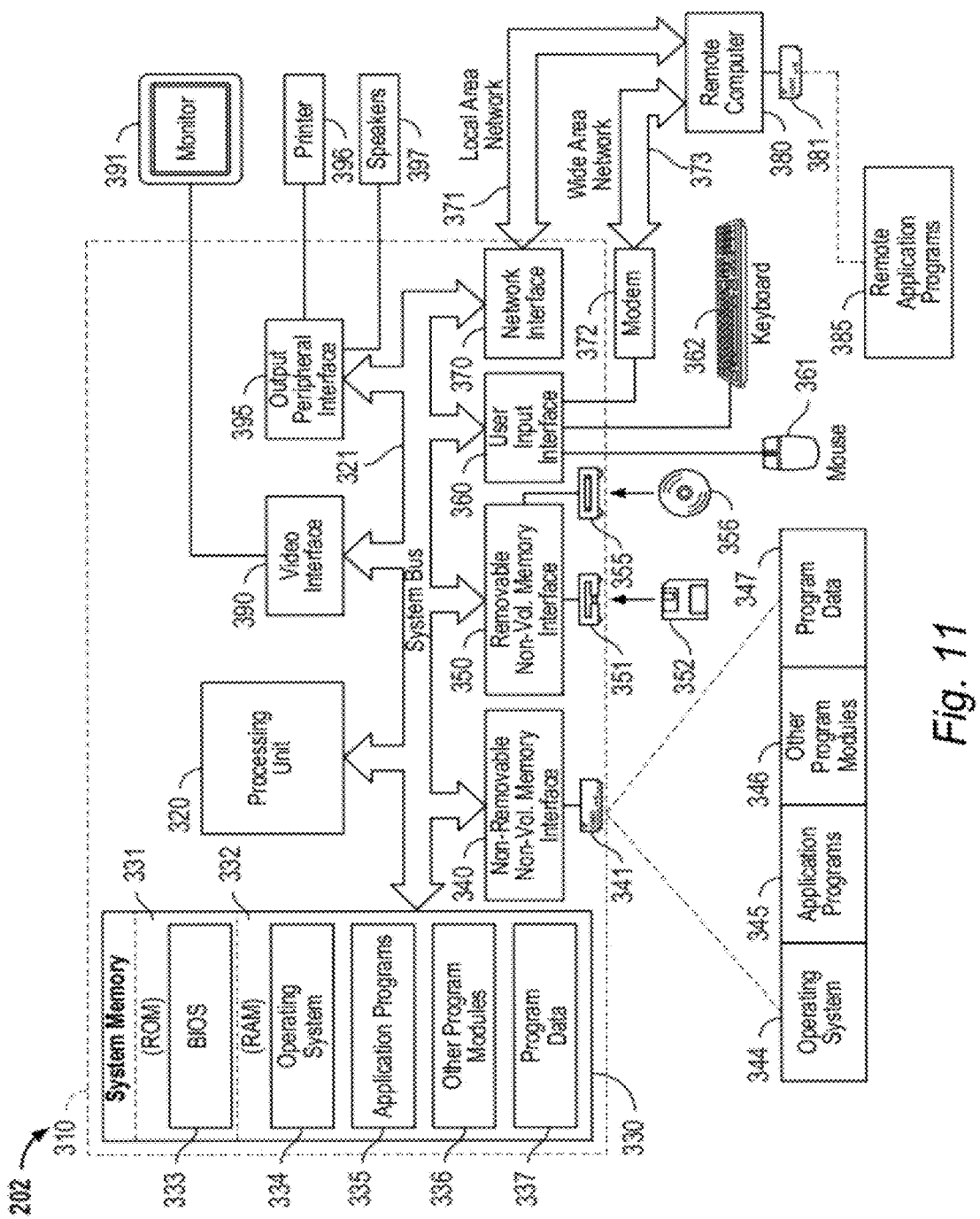
FIG. 11 is a block diagram of hardware components on which embodiments of the present system are capable of operation.

FIG. 11 illustrates an example of a suitable general computing system environment 202 that may comprise a processing device shown herein on which the inventive system may be implemented. The computing system environment 202 is only one example of a suitable computing environment and is not intended to suggest any limitation as to the scope of use or functionality of the inventive system. Neither should the computing system environment 202 be interpreted as having any dependency or requirement relating to any one or combination of components illustrated in the exemplary computing system environment 202.

The inventive system is operational with numerous other general purpose or special purpose computing systems, environments or configurations. Examples of well known computing systems, environments and/or configurations that may be suitable for use with the inventive system include, but are not limited to, personal computers, server computers, multi-processor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 11, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as ROM 331 and RAM 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 11 illustrates operating system 334, application programs 335, other program modules 336, and program data 337.

The computer 310 may also include other removable/non-removable, volatile/nonvolatile computer storage media. By way of example only, FIG. 11 illustrates a hard disc drive 341 that reads from or writes to non-removable, nonvolatile magnetic media and a magnetic disc drive 351 that reads from or writes to a removable, nonvolatile magnetic disc 352. Computer 310 may further include an optical media reading device 355 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 11, provide storage of computer readable instructions, data structures, program modules and other data for the computer 310. In FIG. 11, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor 391, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 11. The logical connections depicted in FIG. 11 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 11 illustrates remote application programs 385 as residing on memory device 381.

It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

I claim:

1. A system for generating an E.164 compliant telephone number from an input telephone number in a voice over IP platform, the system comprising:
   a call origin routine for receiving information regarding one or more call origin profiles from which a user makes telephone calls;
   a user interface for a user to select a call origin profile from the one or more call origin profiles set via the call origin routine, and for a user to provide a telephone number to call;
   an E.164 database including E.164 call information; and
   an E.164 call formatting engine for examining the telephone number and the call origin profile received via the user interface, and formatting the telephone call into an E.164 compliant telephone number using the E.164 database if the E.164 call formatting engine determines the received telephone number is not an E.164 compliant telephone number for the call origin profile.

2. The system of claim 1, further comprising signaling and voice engine for placing a telephone call using the E.164 compliant telephone number formatted by the E.164 call formatting engine.

3. The system of claim 1, wherein the call origin routine receives and stores a name for a call origin profile.

4. The system of claim 1, wherein the call origin routine receives geographic information for a call origin profile.

5. The system of claim 4, wherein the geographic information is received via user-selection from a drop-down menu.

6. The system of claim 1, wherein the E.164 call formatting engine determines if the received telephone number starts with an international direct dialing prefix appropriate to a geographic location specified in the call origin profile.

7. The system of claim 6, wherein the E.164 call formatting engine treats the received telephone number as a telephone number for an international call where the E.164 call formatting engine determines that the received telephone number starts with an international direct dialing prefix appropriate to the geographic location specified in the call origin profile.

8. The system of claim 1, wherein the E.164 call formatting engine determines if the received telephone number starts with an international direct dialing prefix included in the E.164 database.

9. The system of claim 1, wherein the E.164 call formatting engine determines if the received telephone number starts with a national direct dialing prefix appropriate to a geographic location specified in the call origin profile.

10. The system of claim 9, wherein the E.164 call formatting engine treats the received telephone number as a telephone number for an national call where the E.164 call formatting engine determines that the received telephone number starts with a national direct dialing prefix appropriate to the geographic location specified in the call origin profile.

11. In a computer system having a graphical user interface including a display and a user interface selection device, a method of generating an E.164 compliant telephone number from an input telephone number in a voice over IP platform, the method comprising:
   (a) receiving via the graphical user interface a call origin profile;
   (b) receiving via the graphical user interface a telephone number; and
   (c) formatting the received telephone number into E.164 compliant telephone number using an origin of the telephone call indicated by the call origin profile received in said step (a) and using a call destination indicated by the telephone number received in said step (b).

12. The method of claim 11, wherein said step (a) comprises step of receiving a call origin profile that is manually entered or configured using a drop down menu displayed via the graphical user interface.

13. The method of claim 11, wherein a user sets a first default call origin profile for a first computing device to be received in said step (a), and a second default call origin profile for a second computing device to be received in said step (a).

14. The method of claim 11, wherein said step (b) comprises step of receiving a telephone number that is manually entered, selected from a list of stored contacts or selected from a website.

15. The method of claim 11, wherein said step (c) comprises analyzing the received telephone number to determine if it is an E.164 compliant telephone number for the received call origin profile, and placing the telephone call if it is determined that the received telephone number is an E.164 compliant telephone number for the received call origin profile.

16. The method of claim 11, wherein said step (c) comprises identifying one of an international direct dialing prefix and a national direct dialing prefix in the first digits of the telephone number received in said step (b), and placing a telephone call using the call origin specified in the call origin profile received in said step (a) and using the international or national destination specified in the telephone number received in said step (b).

17. A method of generating an E.164 compliant telephone number from an input telephone number in a voice over IP system, the method comprising:
   (a) receiving in a computing device of the voice over IP system a defined call origin location including at least one of a country code and an area code for an intended geographic origin of a telephone call using the input telephone number;
   (b) determining in one more processors associated with the computing device whether the input telephone number is an E.164 compliant telephone number;
   (c) determining in the one more processors whether the input telephone number is the proper length for a local call made from the call origin location if it is determined in said step (b) that the input telephone number is not an E.164 compliant telephone number; and
   (d) adding at least one of an E.164 prefix, a country code and an area code for the call origin location received in said step (a) if it is determined in said step (c) that the input telephone number is the proper length for a local call made from the call origin location.

18. The method of claim 17, further comprising the step (e) of determining whether the input telephone number includes a direct dialing prefix if it is determined in said step (c) that the input telephone number is not the proper length for a local call made from the call origin location.

19. The method of claim 18, wherein said step (e) is performed by comparing the first digits of the received telephone number against a database of E.164 direct dialing prefixes.

20. The method of claim 18, wherein said step (e) determines that the input telephone number includes an international direct dialing prefix if the first two digits of the input telephone number are "00".

* * * * *